(12) United States Patent
Yin et al.

(10) Patent No.: US 8,203,775 B1
(45) Date of Patent: Jun. 19, 2012

(54) MEMS BISTABLE OPTICAL SWITCH AND METHODS FOR USE THEREOF

(75) Inventors: Luzhong Yin, Andover, MA (US);
Guixiong Zhong, Billerica, MA (US);
Yuanxin Shou, Wellesley, MA (US);
Amit Ghosh, Shrewsbury, MA (US);
Jun Yan, Reading, MA (US); Jing Zhao, Winchester, MA (US)

(73) Assignee: Agiltron, Inc., Woburn, MA (US)

(*) Notice: Subject to any disclaimer, the term of this patent is extended or adjusted under 35 U.S.C. 154(b) by 0 days.

(21) Appl. No.: 13/210,703

(22) Filed: Aug. 16, 2011

(51) Int. Cl.
*G02B 26/08* (2006.01)
(52) U.S. Cl. .................. 359/221.2; 385/18; 359/900
(58) Field of Classification Search .... 359/196.1–226.2, 359/290; 385/16–18, 47
See application file for complete search history.

(56) References Cited

U.S. PATENT DOCUMENTS

| 6,804,036 | B1 | 10/2004 | Chen et al. | |
|---|---|---|---|---|
| 6,853,765 | B1 | 2/2005 | Cochran | |
| 6,911,891 | B2 | 6/2005 | Qiu et al. | |
| 7,221,817 | B2 | 5/2007 | German et al. | |
| 7,480,089 | B2 * | 1/2009 | Kmecko | 359/290 |

OTHER PUBLICATIONS

Qiu, Jin, et al, "A curved-beam bistable mechanism," Journal of Microelectromechanical Systems, Apr. 2004, vol. 13, Issue 2, pp. 137-146.
Casals-Terre, J. and Shkel, A., "Dynamic analysis of a snap-action micromechanism," 2005 IEEE Sensors, 2005.
Oh, Youngseok, "Synthesis of multistable equilibrium compliant mechanisms," Ph.D. Thesis, Univ. of Michigan, 2008.
Que, Long, et al., "Bent-beam electrothermal actuators—part I: single beam and cascaded devices," Journal of Microelectromechanical Systems, vol. 10, No. 2, Jun. 2001.

* cited by examiner

*Primary Examiner* — James Phan
(74) *Attorney, Agent, or Firm* — Burns & Levinson LLP; Jacob N. Erlich; Orlando Lopez (57) ABSTRACT

An optical switch including a bistable component, a reflective component, the reflective component being operatively connected to the bistable component, a first electrothermal bent beam actuator, a first contacting component operatively connected to the first electrothermal bent beam actuator component, the first electrothermal bent beam actuator component and the first contacting component disposed such as to enable advancing the bistable component the reflective component from a first stable configuration to a second stable configuration, a second electrothermal bent beam actuator component and a second contacting component operatively connected to the second electrothermal bent beam actuator component, the second electrothermal bent beam actuator component and the second contacting component disposed such as to enable advancing the bistable component and the reflective component from the second stable configuration to the first stable configuration.

21 Claims, 9 Drawing Sheets

MEMS BISTABLE OPTICAL SWITCH AND METHODS FOR USE THEREOF

BACKGROUND

These teachings relate generally to MEMS optical switches.

Optical switches are devices that route optical signals along selected fibers of an optical network. Such switches constitute the fundamental building blocks of modern optical networks. Prior art optical switches are primarily based on mechanisms that perform mechanical movements, change waveguide coupling ratios, and perform polarization rotations. Mechanical relay based optical switches has large size. Considerable interest has been shown in MEMS technology for its small size. Among them, MEMS electrostatic rotating mirror based devices are one of most common approaches. However, their need for a high electrical field to generate sufficient actuation force results in the requirement of costly hermetic packaging. Furthermore, they are non-latched and switch states are lost when external electric power is lost. A bistable mechanism using electro-thermal actuation is also used for optical switches. However, those devices use an in-plane actuation for a vertical etched mirror, leading to costly fabrication and small depth mirror size.

Therefore, there is a need for an improved MEMS switch design that is small in size, ultra-stable, latching, low cost and easy to manufacture, scalable to multiple output ports.

BRIEF SUMMARY

One embodiment of the optical switch of these teaching includes a bistable component comprising one or more first beams and one or more second beams, a reflective component; the one or more first beams extending from a first support to a location on the reflective component, the one or more second beams extending from a second support to the location on the reflective component, the reflective component being operatively connected to the bistable component, a first electrothermal bent beam actuator component extending from a first electrode to a second electrode, a first contacting component operatively connected to the first electrothermal bent beam actuator component, the first electrothermal bent beam actuator component and the first contacting component disposed such as to enable advancing the bistable component the reflective component from a first stable configuration to a second stable configuration, a second electrothermal bent beam actuator component extending from a third electrode to a fourth electrode and a second contacting component operatively connected to the second electrothermal bent beam actuator component, the second electrothermal bent beam actuator component and the second contacting component disposed such as to enable advancing the bistable component and the reflective component from the second stable configuration to the first stable configuration.

Values other embodiments of the optical switch of these teachings are also disclosed.

Embodiments of the method of operation of the optical switch of these teachings and embodiments of methods for fabricating the optical switch of these teachings are also disclosed.

For a better understanding of the present teachings, together with other and further objects thereof, reference is made to the accompanying drawings and detailed description and its scope will be pointed out in the appended claims.

BRIEF DESCRIPTION OF THE DRAWINGS

FIGS. 2a and 2b show an optical system utilizing embodiment of the optical switch of these teachings;

DETAILED DESCRIPTION

The following detailed description is of the best currently contemplated modes of carrying out these teachings. The description is not to be taken in a limiting sense, but is made merely for the purpose of illustrating the general principles of these teachings, since the scope of these teachings is best defined by the appended claims.

In one embodiment, the present teachings overcome the above problems by providing an optical switch that uses one or more elements of micro-electro-mechanical system (MEMS) devices aligned with one or more fiber collimators to steer light beams from one or more input ports to one or more output ports. In that embodiment, a MEMS chip has an in-plane optical reflective component (such as, but not limited to, a mirror) suspended on a self-latching bistable mechanism, and two electrothermal actuator components. The actuators drive the bistable mechanism from its first stable position to its second stable position and from its second stable position to its first position. Thus, the suspended mirror directs the light beam in a plane that is perpendicular to the plane of the MEMS device to different output ports at different stable positions through either transmission or reflection of the light beam.

In one embodiment of the present teachings, the above and the optical switch includes a MEMS bistable mirror configuration comprising a frame having a planar surface, two MEMS actuators that drive the reflective mirror in the planar surface to its stable positions to steer light beam transmitting from sources of electromagnetic radiation such as, but not limited to, optical fibers.

In one embodiment, the reflective mirror surface is suspended by multiple identical paralleled bistable mechanisms, which constraint the motion of mirror in the plane of the mirror surface.

In one embodiment of the bistable mechanism formed by curved beam segments arranged symmetrical to the suspended mirror and anchored at an outer frame.

In one embodiment, each actuator component is formed by multiple electrothermal parallel V-beams with optimal displacement output.

In one embodiment, each set of actuators has one center or multiple contact surfaces along the bistable mechanism to push the mirror to different stable locations. When multiple contact surfaces are used, different contact surfaces may have different time sequence to contact. This can decrease the mechanical wear on each contact surface to increase contact cycle life. The off-center actuations can also increase travel distance of the mirror.

In one embodiment, the one or more contact surfaces have a flexible surface and a hard surface to form a self-contact when contact force applied. This can decrease contact force on each surface therefore increase contact life time. When different contact surfaces have different time sequences, the contact duration can be further enhanced.

In one embodiment, the mirror position can be detected through resistance change of the components of the bistable mechanism (silicon wire in one embodiment) due to a change in the strain of the bistable mechanism. At this first stable position, the bistable mechanism has substantially no strain while at the second stable position, strain is developed.

In one embodiment, the mirror position can be detected through capacitance change due to gaps between the contact surfaces changes at each stable position.

In one embodiment, the MEMS fabrication steps are simplified by using only a few steps with a minimum number of masks using silicon on insulator (SOI) wafers.

Figure 1:
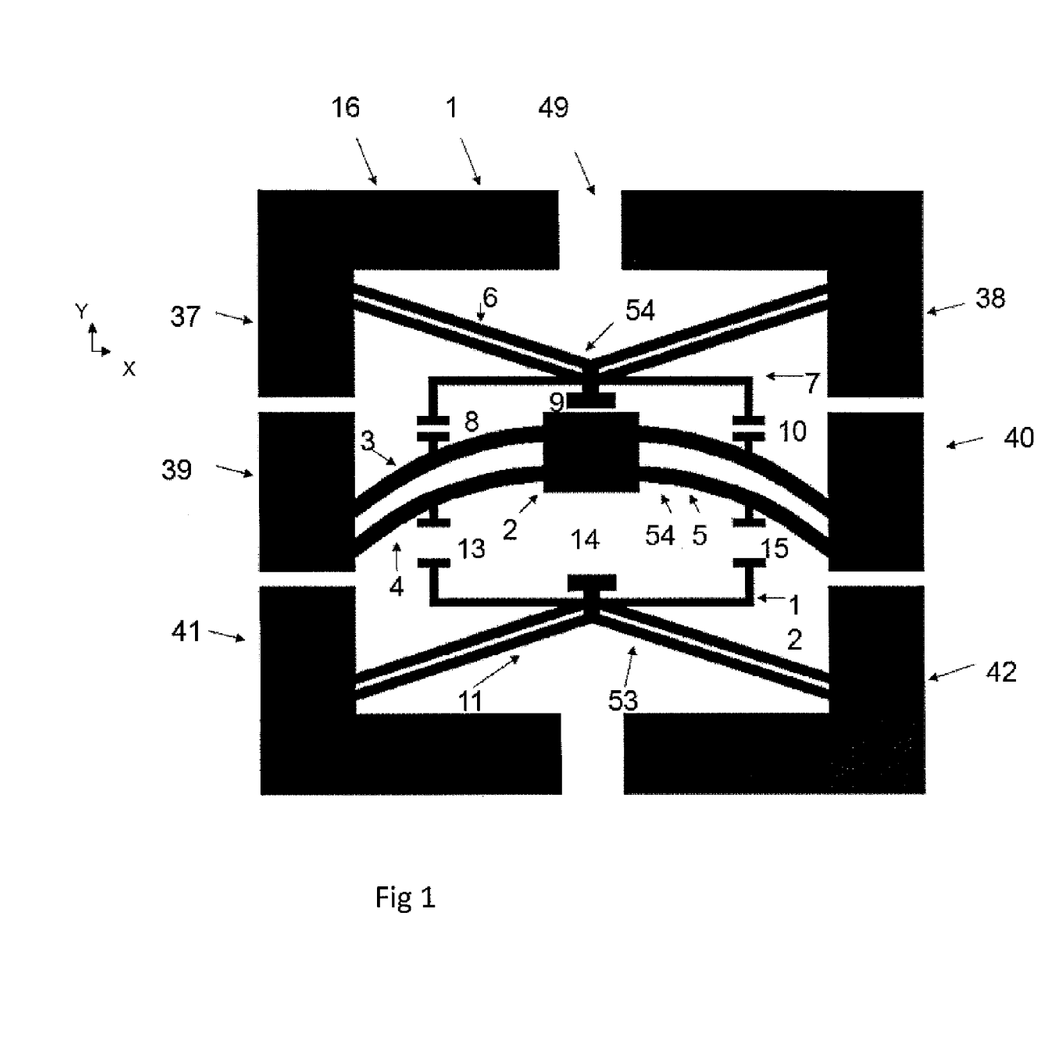
FIG. 1 is a schematic representation of one embodiment of the optical switch of these teachings.
Figure 2:
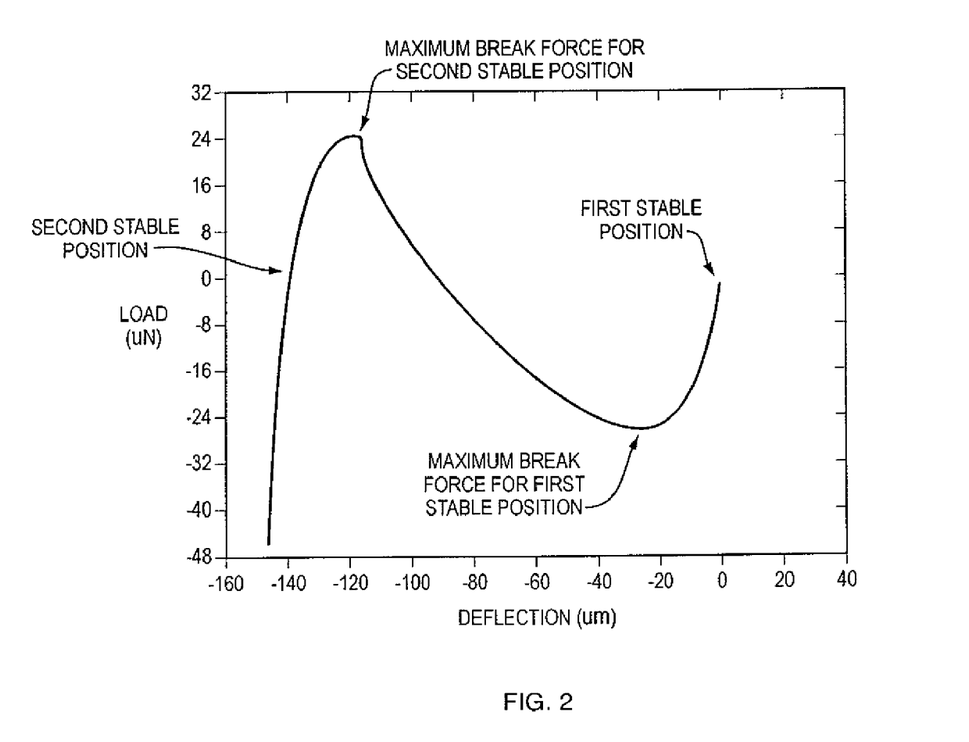
FIG. 2 is a graphical representation of displacement-force relationship in a bistable component in one embodiment of the optical switch of these teachings.

FIG. 1 illustrates a schematic view of an embodiment of a MEMS bistable optical switch chip. The MEMS bistable optical switch chip 1 includes a substrate 49 (embodiments in which the bistable optical switch chip is lifted from the substrate are also within the scope of these teachings) having a planar surface frame 16, a reflective mirror 2 arranged on the planar surface 16, a bistable mechanism 3 formed by two curved beams 4 and 5 and symmetrical to the center of the mirror 2; two electrothermal actuators 6 and 11. The bistable mechanism 3 suspends the mirror 2 on the frame 16. Multiple identical, paralleled bistable mechanisms 3 are used to restrict the motion of the mirror in the plane 16 along the symmetric axis of the bistable mechanism or Y axis. Typical displacement-force relationship of the bistable mechanism is shown in FIG. 2. The two stable positions are as labeled in the plot. Each stable position has a maximum break force as labeled in FIG. 2.

A number of possible embodiments of the bistable mechanism are within the scope of these teachings. Embodiments such as, but not limited to, those disclosed in U.S. Pat. No. 6,911,891, issued to Qui et al., which is incorporated by reference herein in its entirety for all purposes, and the embodiments disclosed in Jin Qiu; Lang, J. H.; Slocum, A. H., A curved-beam bistable mechanism. Journal of Micro-electromechanical Systems, April 2004, Vol. 13, Issue 2, pp. 137-146, Casals-Terre, J., Shkel, A., Dynamic Analysis Of A Snap-Action Micromechanism, 2005 IEEE Sensors, 2005, and Youngseok Oh, Synthesis of Multistable Equilibrium Compliant Mechanisms, Ph. D. Thesis, Univ. of Michigan, 2008, all of which are incorporated by reference herein in their entirety for all purposes, are within the scope of these teachings.

Electrothermal actuator 6 is used to switch the bistable mechanism from first stable position to second stable position, or the mirror 2 from the first stable position to the second stable position. Electrothermal actuator 11 is used to switch the bistable mechanism from second stable position to first stable position, or the mirror 2 from the second stable position to the first stable position. Actuator 6 has a multiple identical paralleled V-beam wire structure 54, force and displacement translation beam 7, and contact surfaces 8, 9 and 10 (the force and displacement translation beam 7, and contact surfaces 8, 9 and 10 are one embodiment of a first contacting component and the force and displacement translation beam 12, and contact surfaces 13, 14 and 15 are one embodiment of a second contacting component) to interact with bistable mechanism 3. Note a single contact surface 9 can be used for actuation and is covered by this patent. The actuator 6 has two electrodes 37 and 38 are on the frame surface 16. When a voltage different applied on electrodes, a driving electric current will apply to the wires (beams) 54 of the actuator 6, the wires 54 and contact surfaces 8, 9 and 10 will move along Y-axis to close to the bistable mechanism 3 and mirror 2. The contact forces at those contact surfaces will push the bistable mechanism 3 and mirror 2 to its second stable position. The multiple surfaces 8, 9 and 10 have different time sequence to engage with the bistable mechanism 3 and mirror 2 with 9 first and then 8 and 10. This different time contact sequence can greatly reduce mechanical wear at each surface therefore increase switch cycle life. Off-center contact surface 8 and 10 can also increase the travel distance of the mirror 2, and, therefore, increase mirror size.

In the embodiment shown in FIG. 1, the actuator 11 has multiple V-beam (also referred to as "bent beam") wire (beam) structure 53. When a current is applied the wires 53 through electrodes 41 and 42 which are on the surface 16, the center of the wires 53 will move the contact surfaces 13, 14 and 15 close to the mirror 2 and bistable mechanism 3. The contact forces will move the bistable mechanism 3 and the mirror 2 from the second stable position to the first stable position. The multiple contact surfaces 13,14 and 15 are used to decrease mechanical wear, increase contact duration and travel distance of the mirror 2 along Y-axis.

A variety of bent beam actuators are within the scope of these teachings. Actuators such as, but not limited to, those disclosed in U.S. Pat. No. 6,853,765, to K. Cochran, and in Long Que et al., Bent-Beam Electrothermal Actuators-Part I: Single Beam and Cascaded Devices, Journal of Microelectromechanical Systems, Vol. 10, NO. 2, June 2001, both of which are Incorporated by reference herein in their entirety for all purposes. Actuators that are not bimetallic actuators are within the scope of these teachings With mirror size along Y-direction equal or less to the (largest) travel distance of the bistable mechanism along the Y direction (the distance travelled by the mirror in the direction substantially perpendicular to the contact surfaces), when light beams in the plane perpendicular to the plane 16 with light beam sizes equal or smaller to the mirror size, the mirror 2 can completely block the light beam and steer the light beam to different directions at one stable position while let the light beams continue propagate in the original direction without effect at the other stable position. Multiple light beams with such MEMS chips can be used to form a switch with multiple input ports and multiple output ports.

The stable positions of the mirror 2 can be detected by the intrinsic strain gage properties of the bistable mechanism 3. At the first stable position, the bistable mechanism has substantially no strain while at second stable position, a large strain is developed. Therefore, by measuring the resistance change between the electrodes 39 and 40, the positions of the mirror 2 can be detected. An another embodiment of the method to detect the mirror 2 positions is to detect the capacitance change at electrodes 37 and 39 or 39 and 41 due to the gap changes between the contact surfaces at different stable position.

Figure 1A:
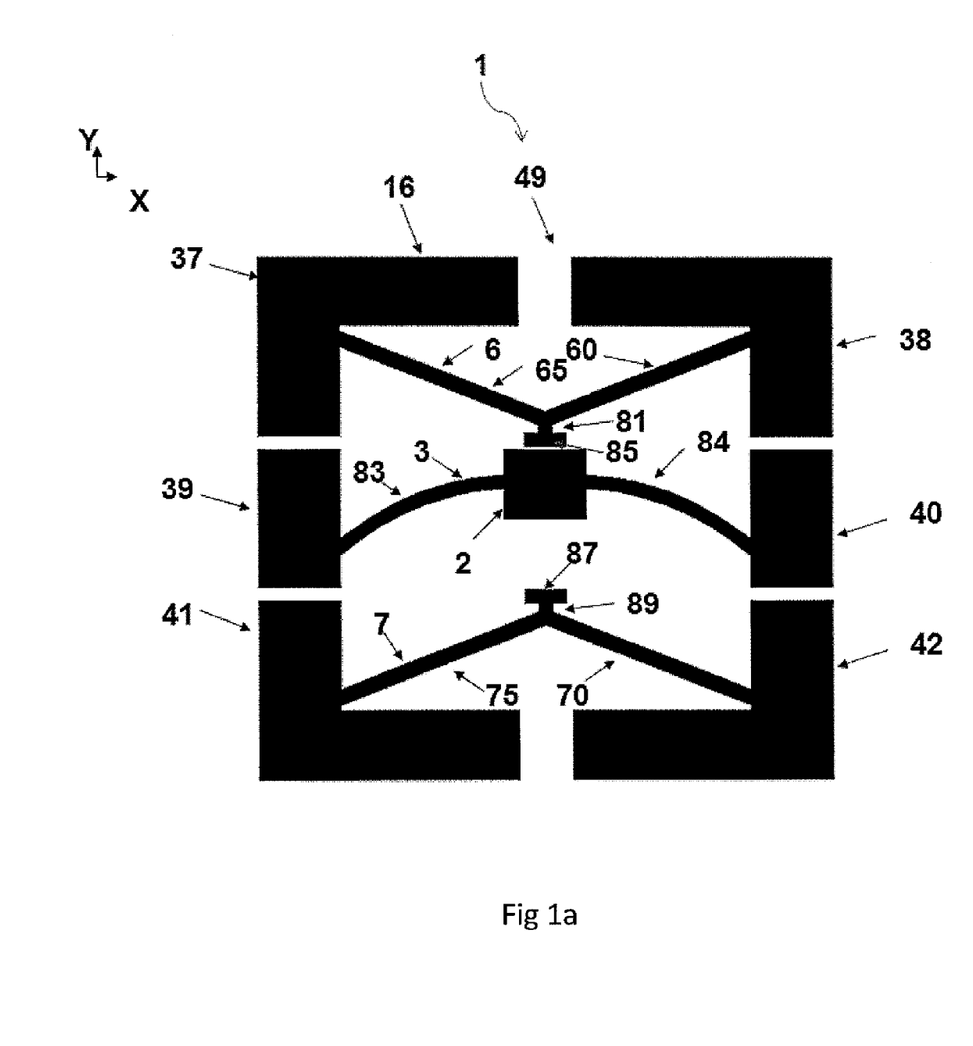
FIGS. 1a and 1b are schematic representations of another embodiment of the optical switch of these teachings.
Figure 1B:
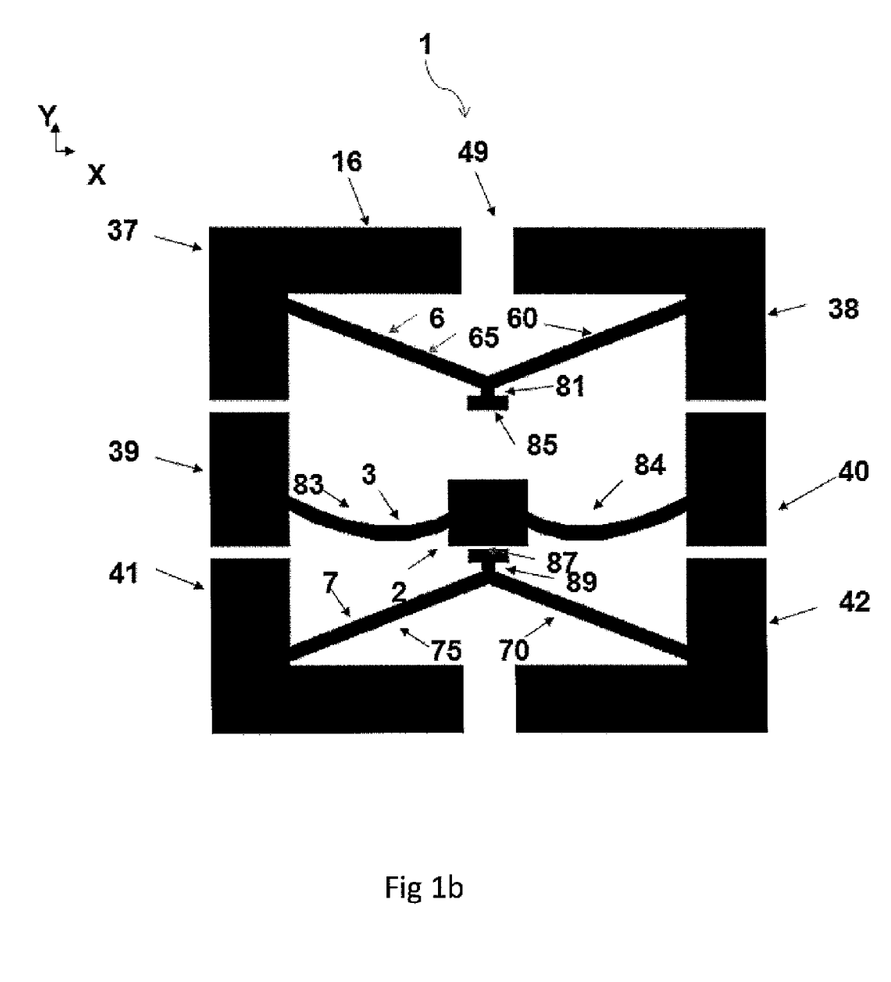

In another embodiment, shown in FIGS. 1a and 1b, the bistable mechanism 3 is comprised of two curved beams (83, 84) and each bent beam actuator 6, 11 has one beam comprised of two parts (60, 65 for the first bent beam actuator 6, 75, 70 for the second bent beam actuator 11). In the embodiment shown in FIGS. 1a and 1b, the first contacting component 81 has a single contact surface 85 and the second contacting component 89 has a single contact surface 87. FIG. 1a shows the bistable component 3 in a first stable configuration and FIG. 1b shows the bistable component 3 in the second stable configuration.

Figure 3:
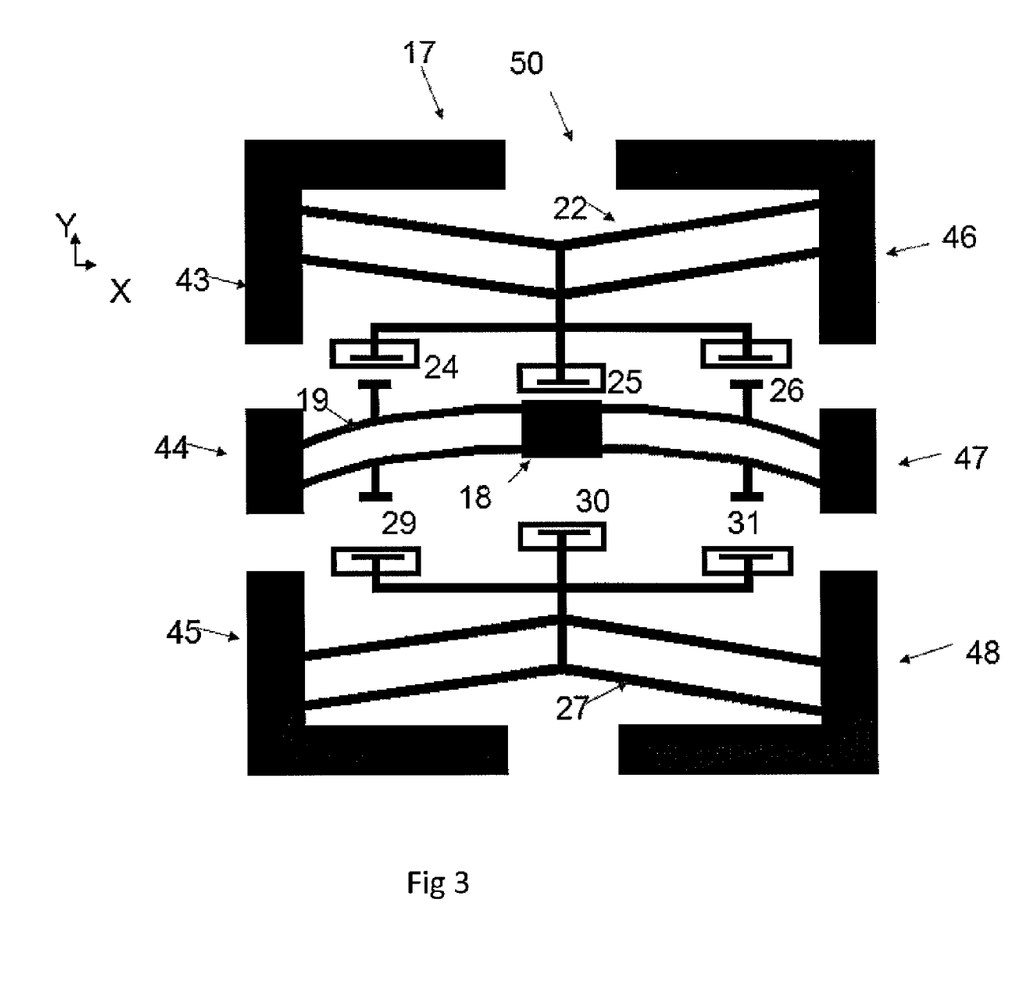
FIG. 3 is a schematic representation of yet another embodiment of the optical switch of these teachings.

In yet another embodiment, shown in FIG. 3, the MEMS bistable optical switch 17 includes a substrate 50 (embodiments in which the bistable optical switch is lifted from the substrate are also within the scope of these teachings) having a planar surface frame 17, a reflective mirror 18 arranged on the planar surface 17, a bistable mechanism 19 suspending the mirror 18 to frame 17. Multiple identical, paralleled bistable mechanisms 19 are used to restrict the motion of the mirror in the plane 16 along the symmetric axis of the bistable mechanism or Y axis.

Figure 4A:
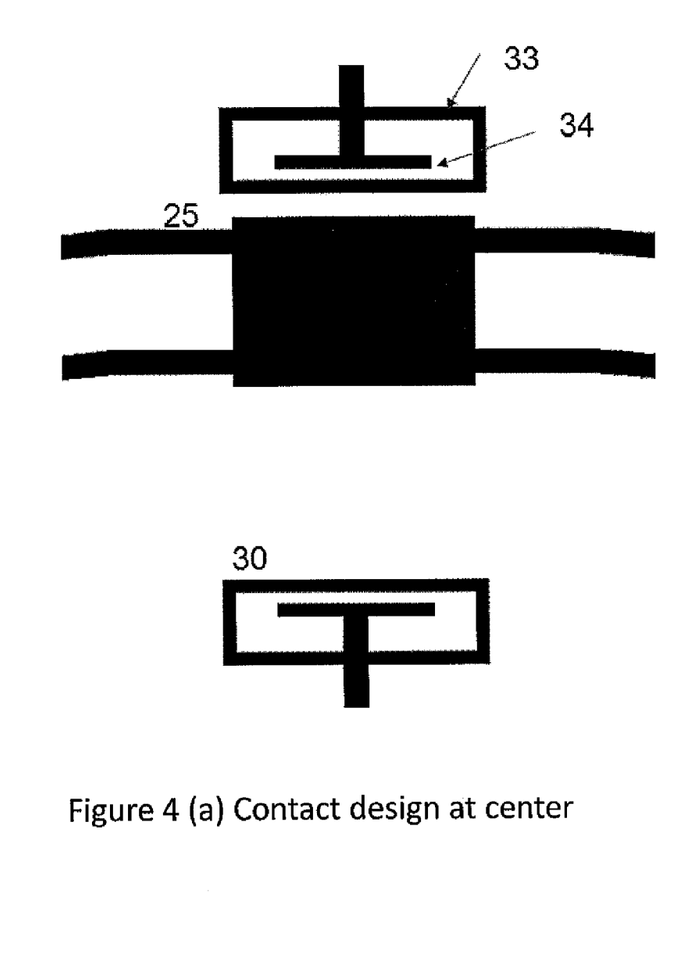
FIGS. 4a and 4b are schematic representations of embodiment of one component of the optical switch of these teachings.
Figure 4B:
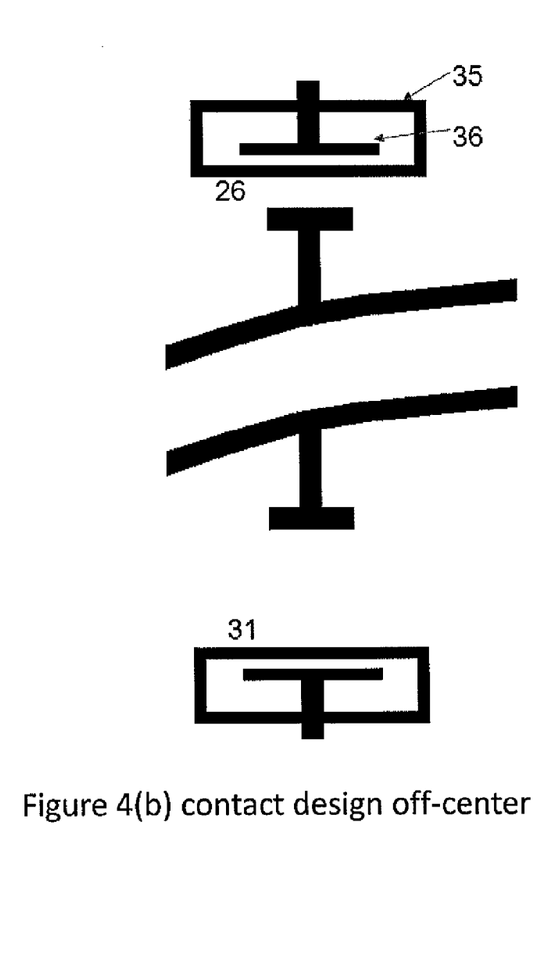

Electrothermal actuator 22 is used to switch the mirror 18 from its first stable position to its second stable position. Electrothermal actuator 27 is used to switch the mirror 18 from its second stable position to its first stable position. Actuator 22 has contact surfaces 24, 25 and 26 to interact with bistable mechanism 19. As shown in FIG. 4a, contact surface 25 has a flexible frame 33 and inside close-by hard surface 34. When contact force is applied, the contact surface 25 will become self-contacting. This can decrease contact force on each surface therefore increase contact life time. FIG. 4b shows the self-contacting off-center contact surface 26 design. Similarly, the flexible frame 35 will contact with the inside close-by hard surface 36 when contact force applied. Therefore, the contact force is decreased for each surface. Actuator 27, which for switch the mirror 18 from its the second stable position to its first stable position, has contact surfaces self-contacting surface 29, 30 and 31 similarly as shown in FIGS. 4a and 4b.

In one embodiment the method of these teachings includes providing an optical switch as described herein above where the bistable component and the reflective opponent are in initial state, the initial state being the first stable configuration or the second stable configuration, applying a predetermined voltage across the actuating component, the actuating component being either the first or the second electrothermal bent beam actuator depending on the initial state. The predetermined voltage causes a current equal to or higher than a predetermined current to flow across the actuating component. The current flow in the actuating component causes the actuating component and the driving component, the driving component being the first or second contacting component, to advance the bistable component of the reflective component from the initial state to a second state, the second state being the other stable configuration. By moving the reflective component from one stable configuration to the other stable configuration, one or more optical beams are switched.

The above disclosed embodiment of the method of these teachings can also include measuring a resistance change in the bistable component in order to determine whether the bistable component is in the first stable configuration or in the second stable configuration. In another instance, the embodiment of the method includes measuring a change in the capacitance between the first electrothermal bent beam actuator and the bistable component or between the second electrothermal bent beam actuator and the bistable component. The above embodiments of the method of these teachings are not limited to configurations in which the bistable component is in the first stable configuration or in the second stable configuration. Methods that apply to either configuration are within the scope of these teachings.

When the first contacting component has a first number of contact surfaces and the second contacting components has a second number of contact surfaces, applying a predetermined voltage across the actuating component (first or second electrothermal bent beam actuator) causes each one of the contact surfaces, in either the first number of contact surfaces or the second number of contact surfaces, at a different time in a time sequence (also referred to as at one predetermined time from a number of predetermined times).

FIGS. 2a and 2b illustrate the operation of the optical switch in one embodiment of an optical system, these teachings not being limited to only that optical system. Referring to FIGS. 2a and 2b, the embodiment 100 shown therein includes an optical switch 1 such as disclosed hereinabove, a first optical system 101 and a second optical system 102 and optical beams 108, 109 propagating between optical system 101 an optical system 102. Optical beams 104 and 105 input/exit the first optical system 101 and optical beams 106 and 107 exit/input the second optical system 102. In the configuration shown in FIG. 2a, the two optical beams 108, 109 propagate unobstructed between the first optical system 101 and the second optical system 102. When the optical switch is operated and the reflective component moves to the other stable configuration, as shown in FIG. 2b, the reflective component intersects the propagating beams 108, 109. The propagating beams 108, 109 can be deflected to a location different from the other optical system.

Figure 5:
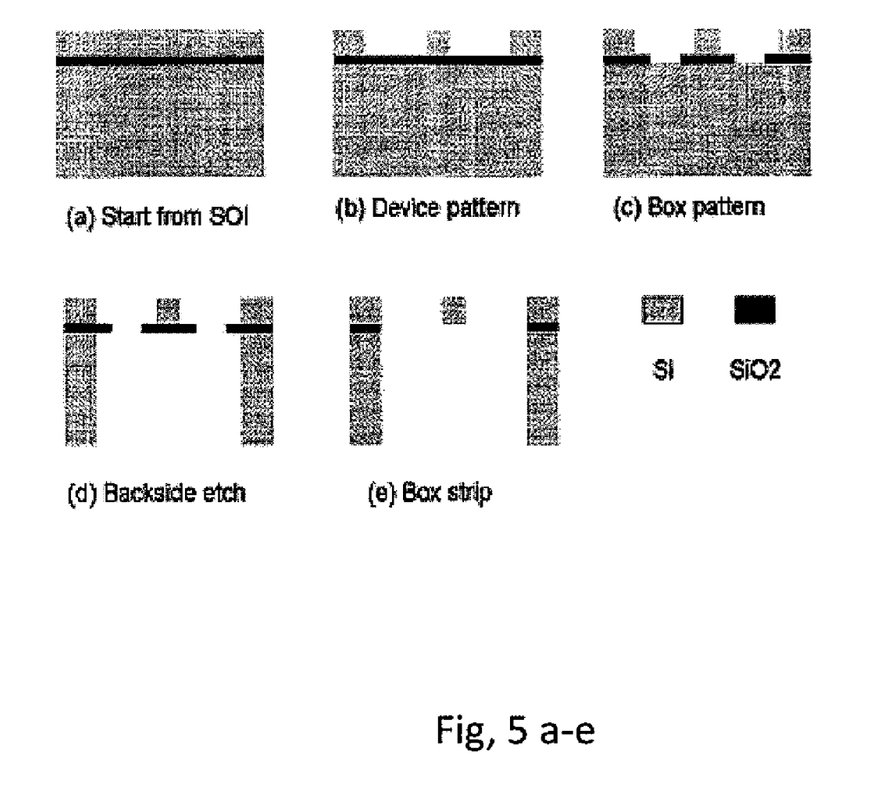
FIGS. 5a-5e are graphic illustrations of an embodiment of a process for manufacturing devices of these teachings.

In one embodiment, the MEMS fabrication steps are simplified by using silicon on insulator (SOI) wafers. MEMS fabrication steps comprise only 5 steps: patterning the front and back sides, front-side deep reactive ion etching (DRIE), back-side DRIE, release of the buried oxide layer (box) oxide, and front-and-back metal depositions. This processing has the advantage that every step has a defined stop by the wafer structure; therefore the process control monitoring is drastically simplified. Specifically, the front-side DRIE will be stopped at the buried oxide layer, the back-side DRIE will also be stopped at the buried oxide layer, the oxide release will have minimal etch rate on the Si material, and metal deposition step (preferred a dry processing step) will have minimal impact to the released spring. The process flow is shown in FIGS. 5a-5b. The process starts with FIG. 5a the SOI wafer substrate, proceeding to FIG. 5b device layer pattern, then FIG. 5c BOX layer pattern to protect the device, then FIG. 5d backside release etch and, lastly FIG. 5e the remaining BOX is stripped away, resulting in a completed optical switch.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:

1. An optical switch comprising:
   a bistable component comprising one or more first beams and one or more second beams;
   a reflective component; said one or more first beams extending from a first support to a location on said reflective component; said one or more second beams extending from a second support to said location on said reflective component; said reflective component being operatively connected to said bistable component;
   a first electrothermal bent beam actuator component extending from a first electrode to a second electrode;
   a first contacting component operatively connected to said first electrothermal bent beam actuator component; said first electrothermal bent beam actuator component and said first contacting component disposed such as to enable advancing said bistable component and said reflective component from a first stable configuration to a second stable configuration;

a second electrothermal bent beam actuator component extending from a third electrode to a fourth electrode; and a second contacting component operatively connected to said second electrothermal bent beam actuator component; said second electrothermal bent beam actuator component and said second contacting component disposed such as to enable advancing said bistable component and said reflective component from the second stable configuration to the first stable configuration.

2. The optical switch of claim 1 wherein said first contacting component comprises a number of first contact surfaces; and wherein said second contacting component comprises a number of second contact surfaces.

3. The optical switch of claim 1 wherein said first contacting component comprises a first contact surface; and wherein said second contacting component comprises a second contact surface.

4. The optical switch of claim 1 wherein said bistable component and said first and second electrothermal bent beam actuator components are substantially located in a planar surface.

5. The optical switch of claim 4 wherein said first, second, third and fourth electrode and said first and second supports are also substantially located in the planar surface.

6. The optical switch of claim 1 wherein said first electrothermal bent beam actuator component comprises a plurality of bent beam actuators; and wherein said second electrothermal bent beam actuator component comprises a plurality of bent beam actuators.

7. The optical switch of claim 1 wherein said bistable component comprises a plurality of first beams and a plurality of second beams.

8. The optical switch of claim 1 wherein a contact surface is said first contacting component comprises a substantially flexible frame and a substantially hard surface disposed inside said substantially flexible frame; and wherein another contact surface in said second contacting component comprises another substantially flexible frame and another substantially hard surface disposed inside said another substantially flexible frame.

9. The optical switch of claim 1 wherein a dimension of said reflective component in a direction of travel from said first contacting component to said second contacting component is at most equal to a distance travelled by said reflective component from the first stable configuration to the second stable configuration.

10. The optical switch of claim 1 wherein a dimension of said reflective component in a direction of travel from said second contacting component to said first contacting component is at most equal to a distance travelled by said reflective component from the second stable configuration to the first stable configuration.

11. The optical switch of claim 1 wherein said bistable component comprises silicon.

12. The optical switch of claim 1 wherein said first electrothermal bent beam actuator component comprises silicon; and wherein said second electrothermal bent beam actuator component comprises silicon.

13. The optical switch of claim 1 wherein the first support comprises a fifth electrode; and wherein the second support comprises a sixth electrode.

14. A method for switching one or more optical beams, the method comprising the steps of:

providing a switch comprising:

a bistable component comprising one or more first beams and one or more second beams;

a reflective component, said one or more first beams extending from a first support to a location on said reflective component, said one or more second beams extending from a second support to said location on said reflective component; said reflective component being operatively connected to said bistable component;

a first electrothermal bent beam actuator component extending from a first electrode to a second electrode;

a first contacting component operatively connected to the first electrothermal bent beam actuator component; the first electrothermal bent beam actuator component and the first contacting component disposed such as to enable advancing the bistable component and the reflective component from a first stable configuration to a second stable configuration;

a second electrothermal bent beam actuator component extending from a third electrode to a fourth electrode; and a second contacting component operatively connected to the second electrothermal bent beam actuator component, the second electrothermal bent beam actuator component and the second contacting component disposed such as to enable advancing the bistable component and the reflective component from the second stable configuration to the first stable configuration; the bistable component and the reflective component being in an initial state selected from the first stable configuration and the second stable configuration; the first electrothermal bent beam actuator component being the actuating component and the first contacting component being the driving component when the first stable configuration is selected as the initial state; the second electrothermal bent beam actuator component being the actuating component and the second contacting component being the driving component when the second stable configuration is selected as the initial state;

applying a predetermined voltage across the actuating component; the predetermined voltage causes at least a predetermined current to flow across the actuating component; and advancing the bistable component and the reflective component from the initial state to a second state selected from the second stable configuration and the first stable configuration; the predetermined current causing the actuating component and the driving component to advance the bistable component and the reflective component; the one or more optical beams being switched when the reflective component advances from the initial state to the second state.

15. The method of claim 14 wherein the first support comprises a fifth electrode; and wherein the second support comprises a sixth electrode; and wherein the method further comprises the step of measuring a resistance change in the bistable component; whereby the initial or second state can be determined to be the first stable configuration or the second stable configuration.

16. The method of claim 14 wherein the first support comprises a fifth electrode; and wherein the second support comprises a sixth electrode; and wherein the method further comprises the step of measuring a capacitance change between the first electrothermal bent beam actuator component and the bistable component; whereby the initial or second state can be determined to be the first stable configuration or the second stable configuration.

17. The method of claim 14 wherein the first support comprises a fifth electrode; and wherein the second support comprises a sixth electrode; and wherein the method further comprises the step of measuring a capacitance change between the second electrothermal bent beam actuator component and the bistable component; whereby the initial or second state can be determined to be the first stable configuration or the second stable configuration.

18. The method of claim 14 wherein the driving component comprises a number of contact surfaces; and wherein the step of applying a predetermined voltage across the actuating component comprises a step of initiating contact between one contact surface of the number of contact surfaces and the bistable component and the operatively connected reflective component at one predetermined time from a number of predetermined times.

19. A method of fabricating an optical switch, the method comprising the steps of:
- patterning the front and back sides of a silicon on insulator (SOI) wafer; and front side being patterned to form an optical switch structure comprising:
  - a bistable component comprising one or more first beams and one or more second beams;
  - a reflective component, said one or more first beams extending from a first support to a location on said reflective component, said one or more second beams extending from a second support to said location on said reflective component; said reflective component being operatively connected to said bistable component;
  - a first electrothermal bent beam actuator component extending from a first electrode to a second electrode;
  - a first contacting component operatively connected to the first electrothermal bent beam actuator component; the first electrothermal bent beam actuator component and the first contacting component disposed such as to enable advancing the bistable component and the reflective component from a first stable configuration to a second stable configuration;
  - a second electrothermal bent beam actuator component extending from a third electrode to a fourth electrode; and
  - a second contacting component operatively connected to the second electrothermal bent beam actuator component, the second electrothermal bent beam actuator component and the second contacting component disposed such as to enable advancing the bistable component and the reflective component from the second stable configuration to the first stable configuration;
- deep reactive ion etching (DRIE) the front side of the SOI wafer;
- deep reactive ion etching (DRIE) the back side of the SOI wafer; and
- releasing a buried oxide layer (box) oxide of the SOI wafer; the release resulting in the optical switch structure.

20. The method of claim 19 further comprising the step of depositing material on predetermined portions of the optical switch structure.

21. The method of claim 20 wherein the step of depositing material comprises the step of depositing a reflective layer on at least one surface of the reflective component.

* * * * *

UNITED STATES PATENT AND TRADEMARK OFFICE
CERTIFICATE OF CORRECTION

| | | |
|---|---|---|
| PATENT NO. | : 8,203,775 B1 | Page 1 of 1 |
| APPLICATION NO. | : 13/210703 | |
| DATED | : June 19, 2012 | |
| INVENTOR(S) | : Luzhong Yin et al. | |

It is certified that error appears in the above-identified patent and that said Letters Patent is hereby corrected as shown below:

On the title page, under (57) Abstract, line 8, "advancing the bistable component the reflective component" should read -- advancing the bistable component and the reflective component --

In column 1, lines 43-44, "advancing the bistable component the reflective component" should read -- advancing the bistable component and the reflective component --

In column 1, line 53, "Values other embodiments" should read -- Various other embodiments --

In column 2, line 2, "these teachings." should read -- these teachings; --

In column 2, lines 40-41, "the above and the optical switch" should read -- the optical switch --

In column 2, line 51, "In one embodiment of the bistable mechanism" should read -- In one embodiment, the bistable mechanism --

In column 2, line 52, "segments arranged" should read -- segments is arranged --

In column 5, line 29, "reflective opponent" should read -- reflective component --

In column 5, line 40, "the bistable component of the reflective component" should read -- the bistable component and the reflective component --

In column 5, line 65, "contact surfaces, at a different time" should read -- contact surfaces, to contact at a different time --

In column 7, line 38, "is said first contacting component" should read -- in said first contacting component --

Signed and Sealed this
Thirty-first Day of July, 2012

David J. Kappos
*Director of the United States Patent and Trademark Office*